United States Patent
Zhang

(10) Patent No.: US 7,930,088 B2
(45) Date of Patent: Apr. 19, 2011

(54) METHOD AND DEVICE FOR CONTROLLING AN INTERNAL COMBUSTION ENGINE

(75) Inventor: Hong Zhang, Tegemheim (DE)

(73) Assignee: Continental Automotive GmbH, Hannover (DE)

( * ) Notice: Subject to any disclaimer, the term of this patent is extended or adjusted under 35 U.S.C. 154(b) by 409 days.

(21) Appl. No.: 11/883,279

(22) PCT Filed: Dec. 29, 2005

(86) PCT No.: PCT/EP2005/057207
§ 371 (c)(1), (2), (4) Date: Jul. 27, 2007

(87) PCT Pub. No.: WO2006/081905
PCT Pub. Date: Aug. 10, 2006

(65) Prior Publication Data
US 2008/0147296 A1    Jun. 19, 2008

(30) Foreign Application Priority Data
Jan. 31, 2005   (DE) .......................... 10 2005 004 442

(51) Int. Cl.
*B60T 7/12* (2006.01)
(52) U.S. Cl. ........................................ 701/103; 701/104
(58) Field of Classification Search .................. 701/103, 701/109, 105, 104; 123/305, 478
See application file for complete search history.

(56) References Cited

U.S. PATENT DOCUMENTS

| | | | |
|---|---|---|---|
| 6,062,201 A * | 5/2000 | Nozawa et al. | 123/478 |
| 6,679,222 B1 * | 1/2004 | Reischl et al. | 123/305 |
| 2002/0033165 A1 * | 3/2002 | Enoki et al. | 123/305 |
| 2004/0237910 A1 * | 12/2004 | Kitamura et al. | 123/21 |

FOREIGN PATENT DOCUMENTS

| | | |
|---|---|---|
| DE | 196 42 653 C1 | 1/1998 |
| DE | 198 21 217 A1 | 11/1998 |
| DE | 198 57 785 A1 | 6/2000 |
| DE | 199 36 944 A1 | 2/2001 |
| DE | 102 33 778 A1 | 2/2004 |
| DE | 103 46 970 B3 | 11/2004 |
| WO | WO 03/031787 A1 | 4/2003 |

OTHER PUBLICATIONS

Bals, R. et al. "Möglichkeiten und Grenzen einer Optimierung von Ottomotoren mt Direkteinspritzung durch Variabilitäten in der Einspritzung", VDI-Berichte, vol. No. 1952, "Innovative Fahrzeugantriebe", 2004, ISBN 3-18-091852-7, pp. 91 to 108.

* cited by examiner

*Primary Examiner* — Stephen K Cronin
*Assistant Examiner* — J. Page Hufty
(74) *Attorney, Agent, or Firm* — King & Spalding L.L.P.

(57) ABSTRACT

An internal combustion engine is with an injection valve for metering a fuel directly into a combustion chamber during injection. The injection valve is provided with an injection needle whose stroke can be variably adjusted for a given injection process. During the homogenous operation of the internal combusting engine with a desired homogenous fuel distribution, the inventive method consists in predefining a fuel pressure set value, in associating a predefined minimum stroke set value with an injection needle stroke set value, in adjusting a meterable fuel mass set value by modifying an injection duration set value when said injection duration is equal to or less than a predefined maximum duration value. If not, the injection needle stroke set value is modified until the injection duration set value is equal or greater than said predefined maximum duration value. Afterwards, the injection needle stroke and injection duration set value is respectively adjusted.

10 Claims, 2 Drawing Sheets

METHOD AND DEVICE FOR CONTROLLING AN INTERNAL COMBUSTION ENGINE

CROSS REFERENCE TO RELATED APPLICATIONS

This application is the US National Stage of International Application No. PCT/EP2005/057207, filed Dec. 29, 2005 and claims the benefit thereof. The International Application claims the benefits of German application No 10 2005 004 442.5 filed on Jan. 31, 2005, all of the applications are incorporated by reference herein in their entirety.

FIELD OF INVENTION

The invention relates to a method and a device for controlling an internal combustion engine.

BACKGROUND OF THE INVENTION

Ever more stringent statutory regulations regarding permissible emissions of harmful substances from motor vehicles in which internal combustion engines are arranged make it necessary to keep the emissions of harmful substances as low as possible during operation of the internal combustion engine. This can be done on the one hand by reducing the emissions of harmful substances which are produced during combustion of the air/fuel mixture in the respective cylinder of the internal combustion engine. On the other hand, exhaust gas post-treatment systems which convert the emissions of harmful substances that are produced during combustion of the air/fuel mixture in the respective cylinders into harmless substances are employed in internal combustion engines.

Avoiding the emission of soot particles in particular constitutes a major challenge which can be met for example by the provision of a suitable soot particle filter, which is however very costly.

In connection with internal combustion engines in which the injection valves are arranged such that they meter the fuel directly into the respective combustion chambers of the cylinders, it is advantageous to operate these as far as possible in a stratified charge mode in which the air/fuel mixture is stratified in a predefined area in the combustion chamber and the remaining areas only have a very low amount of fuel. In this manner, when the internal combustion engine is operating under partial load, a very high level of efficiency can be achieved. As a result of the nitrogen oxide emissions occurring during this stratified charge operation, a NOx catalytic converter is regularly provided in the case of such types of internal combustion engines which needs to be regularly regenerated again and this operation is supported by adopting a homogenous mode of operation with an enriched air/fuel ratio entering the combustion chamber of the cylinder. In the case of homogenous operation, the air/fuel mixture is distributed as homogeneously as possible throughout the entire combustion chamber of the cylinder.

SUMMARY OF INVENTION

The object of the invention is to set down a method and a device which enable low-emission operation of the internal combustion engine.

This object is achieved by the features described in the claims. Advantageous embodiments of the invention are set down in the claims.

The invention is characterized by a method and a corresponding device for controlling an internal combustion engine with an injection valve, by means of which fuel can be metered directly into a combustion chamber of a cylinder. The injection valve is provided with an injection needle whose stroke can be variably set for a given injection process. During the homogenous operation of the internal combustion engine with a desired homogenous distribution of the fuel in the respective combustion chamber, a desired value is predefined for the fuel pressure which is applied to the injection valve. A predefined minimum stroke is assigned to a desired value for the stroke of the injection needle. A desired value for a fuel mass to be metered is set by way of a variation in a desired value for an injection duration if the desired value for the injection duration is less than or equal to a predefined maximum duration value. Otherwise, the desired value for the stroke of the injection needle is varied until such time as the desired value for the injection duration is less than or equal to the predefined maximum duration value. The desired value for the stroke [and] for the injection duration is then actually set accordingly. The desired value for the fuel pressure can thus be chosen to be of a suitable size in the context of a very good, in other words very fine, atomization of the fuel in the combustion chamber which results in a very good mixture preparation and a reduction in the probability of soot particles occurring. Soot particles are produced in particular when the air/fuel mixture in the respective combustion chamber of the cylinder locally has a lambda value of less than 0.7 and the combustion temperature lies in the range 1600 Kelvin to 2100 Kelvin. The smallest possible stroke of the injection needle of the injection valve additionally contributes to an extremely good atomization of the fuel in the combustion chamber and thus to a very homogeneous distribution accompanied by a reduction in soot particles after combustion.

According to an advantageous embodiment of the invention, the stroke of the injection needle is varied in progressive stages. This has the advantage that control of the injection valve can be configured in a particularly simple manner.

According to a further advantageous embodiment of the invention, the maximum duration value is determined depending on a variable which is representative of an opening duration of the gas inlet valve. This makes it possible to further improve the atomization of the fuel at predefinable operating points. In this connection, it is particularly advantageous if the representative variable is a rotational speed and/or load of the internal combustion engine.

According to a further advantageous embodiment of the invention, the desired value for the fuel pressure is determined depending on the desired value for the fuel mass and the rotational speed. In this manner, the desired value for the fuel pressure can easily be optimized at a maximum possible fuel pressure.

BRIEF DESCRIPTION OF THE DRAWINGS

Embodiments of the invention will be described in detail in the following with reference to the schematic drawings.

In the drawings.

Elements having the same construction or function are identified by the same reference characters in all the figures.

DETAILED DESCRIPTION OF INVENTION

Figure 1:
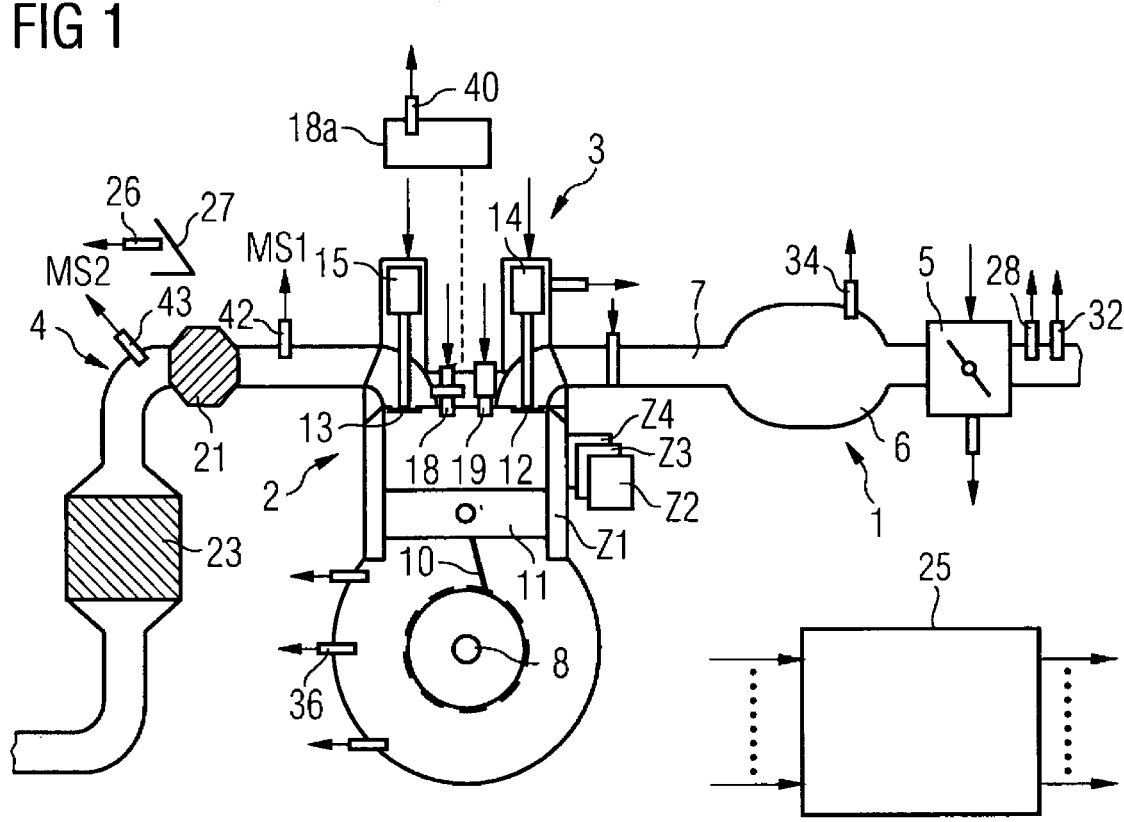
FIG. 1 shows an internal combustion engine.

An internal combustion engine (FIG. 1) comprises an intake tract 1, an engine block 2, a cylinder head 3 and an exhaust gas tract 4. The intake tract 1 preferably comprises a throttle valve 5, and also a collector 6 and an induction manifold 7 which is routed to a cylinder Z1 by way of an inlet duct into the engine block 2. The engine block 2 also comprises a crankshaft 8 which is coupled by way of a connecting rod 10 to the piston 11 of the cylinder Z1.

The cylinder head 3 includes a valve drive system with a gas inlet valve 12 and a gas outlet valve 13.

The cylinder head 3 also includes an injection valve 18 and a spark plug 19.

The injection valve 18 includes an injection needle which can be moved by means of an actuator of the injection valve out of its closed position in which it suppresses the metering of fuel into the combustion chamber of the given cylinder Z1. A stroke of the injection needle denotes its particular excursion from its closed position during an injection process. In the case of a preferred outward opening injection needle, as is regularly used with petrol injection valves, the stroke of the injection needle out of its closed position takes place in the direction of the combustion chamber of the cylinder Z1.

The actuator of the injection valve is designed and coupled to the injection needle such that the stroke can be variably set. A piezo actuator is particularly suitable for this purpose. With regard to a suitably designed embodiment of the injection valve, the actuator may also be a different actuator known to the person skilled in the art, for example an electromagnetic actuator. The injection valve 18 is coupled hydraulically on the input side to a fuel delivery facility 18a which serves to deliver the fuel to it under high pressure. In the fuel delivery facility 18a, when gasoline is used as the fuel the fuel pressure is set to values of up to about 200 bar or even more if need be.

An exhaust gas catalytic converter taking the form of a three-way catalytic converter 21 is arranged in the exhaust gas tract. In addition, a further exhaust gas catalytic converter taking the form of a NOX catalytic converter 23 is preferably arranged in the exhaust gas tract.

A control device 25 is provided, to which are assigned sensors that sense the different measurement variables and determine the value of the measurement variable in each case. Depending on at least one of the measurement variables, the control device 25 determines correcting variables which are then converted into one or more control signals for controlling the final control elements by means of appropriate actuators. The control device 25 can also be described as the device for controlling the internal combustion engine.

The sensors are a pedal position sensor 26 which senses an accelerator pedal position of an accelerator pedal 27, an air mass sensor 28 which senses an air mass flow upstream of the throttle valve 5, a first temperature sensor 32 which senses an intake air temperature, an induction manifold pressure sensor 34 which senses an induction manifold pressure in the collector 6, a crankshaft angle sensor 36 which senses a crankshaft angle to which a rotational speed N is then assigned.

In addition, a first exhaust gas probe 42 is provided which is arranged upstream of the three-way catalytic converter 21 and which senses a residual oxygen content in the exhaust gas and whose measurement signal is characteristic of the air/fuel ratio in the combustion chamber of the cylinder Z1, and upstream of the first exhaust gas probe prior to oxidation of the fuel. In addition, a second exhaust gas probe 43 is provided which is arranged downstream of the three-way catalytic converter 21 and which senses a residual oxygen content in the exhaust gas and whose measurement signal is characteristic of the air/fuel ratio in the combustion chamber of the cylinder Z1, and upstream of the second exhaust gas probe 43 prior to oxidation of the fuel.

In addition, a fuel pressure sensor 40 is provided which senses a fuel pressure in the fuel delivery facility, in particular in a high-pressure store of the fuel delivery facility.

Depending on the embodiment of the invention, any desired subset of the aforementioned sensors can be present or additional sensors may also be present.

The final control elements are for example the throttle valve 5, the gas inlet and gas outlet valves 12, 13, the injection valve 18 or the spark plug 19.

In addition to the cylinder Z1, further cylinders Z2 to Z4 are preferably also provided, to which corresponding final control elements and, where applicable, sensors are then also assigned.

A program is stored in a program memory in the control device 25 and can be executed during operation of the internal combustion engine.

The program is started in a step S1 (FIG. 2), in which variables are initialized as necessary.

In a step S2, a check is made as to whether the internal combustion engine is currently in a state of homogenous operation HS. If this is not the case, then the condition in step S2 is preferably checked again after a predefined waiting time period or after a predefinable crankshaft angle has been passed.

If the condition in step S2 is satisfied, however, then in a step S4 a desired value FUP_SP for the fuel pressure is determined depending on the rotational speed N and a desired value MFF_SP for a fuel mass to be metered. The desired value for the fuel mass to be metered is determined by means of suitable functions of the internal combustion engine depending on the torque to be produced by the internal combustion engine. This in turn is preferably determined in dependent fashion by using a torque model in which a required torque is determined depending on the pedal value from the pedal position sensor and further measurement variables for the internal combustion engine and, where applicable, taking into consideration torque requirements for further functions or units of the internal combustion engine or of the vehicle. By particular preference, depending on the torque to be produced, a required air mass flow to be delivered into the cylinders is determined and set and the fuel mass MFF_SP to be metered is determined depending on an actual air mass flow into the respective cylinders Z1 to Z4 and on the air/fuel ratio to be set.

In a simple embodiment of the program, the desired value FUP_SP for the fuel pressure can also be definitely predefined.

In a step S6, a minimum stroke value L_MIN is assigned to a desired value L_SP for the stroke of the injection needle. The minimum stroke value L_MIN is appropriately predefined such that it is capable of being controlled with the desired precision by means of the actuator of the injection valve, thus allowing a sufficiently precise metering of fuel at the minimum stroke value L_MIN.

In a step S8, a desired value T_INJ_SP for the injection duration is then determined and this is done depending on the desired value MFF_SP for the fuel mass to be metered, the actual value FUP_AV for the fuel pressure sensed by means of the fuel pressure sensor 40, a cylinder pressure P_CYL during metering of the fuel into the combustion chamber of the cylinder, the desired value L_SP for the stroke of the injection needle and for a time offset value T_OFFSET which takes into consideration the control characteristics of the injection valve 18 and is preferably predefined. The cylinder pressure P_CYL during metering of the fuel can be sensed by means of a suitable cylinder pressure sensor. By preference, however, it is determined by means of a physical model depending on further measurement variables, such as for example the induction manifold pressure and the rotational speed. The determination of the desired value T_INJ_SP for the injection duration takes place in the step S8, preferably using the formula specified there, where f, g here stand for functions or also characteristic interpolations.

In a step S10, a maximum duration value T_MAX is determined. The maximum duration value is dependent on an opening duration of the gas inlet valve 12. This is attributed to the fact that during homogenous operation HS the fuel must be metered into the respective combustion chamber of the cylinder Z1 to Z4 at an early stage such that a suitable homogenization of the air/fuel mixture can take place in the combustion chamber. The maximum duration value T_MAX is determined in the step S10 depending on a variable representative of the opening duration of the gas inlet valve 12. This occurs for example depending on the rotational speed N and/or the load LOAD of the internal combustion engine. The load can for example be represented by the induction manifold pressure or also by the air mass flow.

In a step S12, a check is then made as to whether the desired value T_INJ_SP for the injection duration is greater than the maximum duration value T_MAX. If this is not the case, then in a step S14 the injection valve 18 is controlled in accordance with the desired value T_INJ_SP for the injection duration and the desired value L_SP for the stroke of the injection needle for metering the fuel.

If the condition in step S12 is satisfied, however, then in a step S16 the desired value L_SP for the stroke of the injection needle is increased by an increment value DL and processing is subsequently continued in step S8. In this situation, the increment value is suitably formed according to injection valve 18 for the purpose of varying the stroke in progressive stages.

Figure 2:
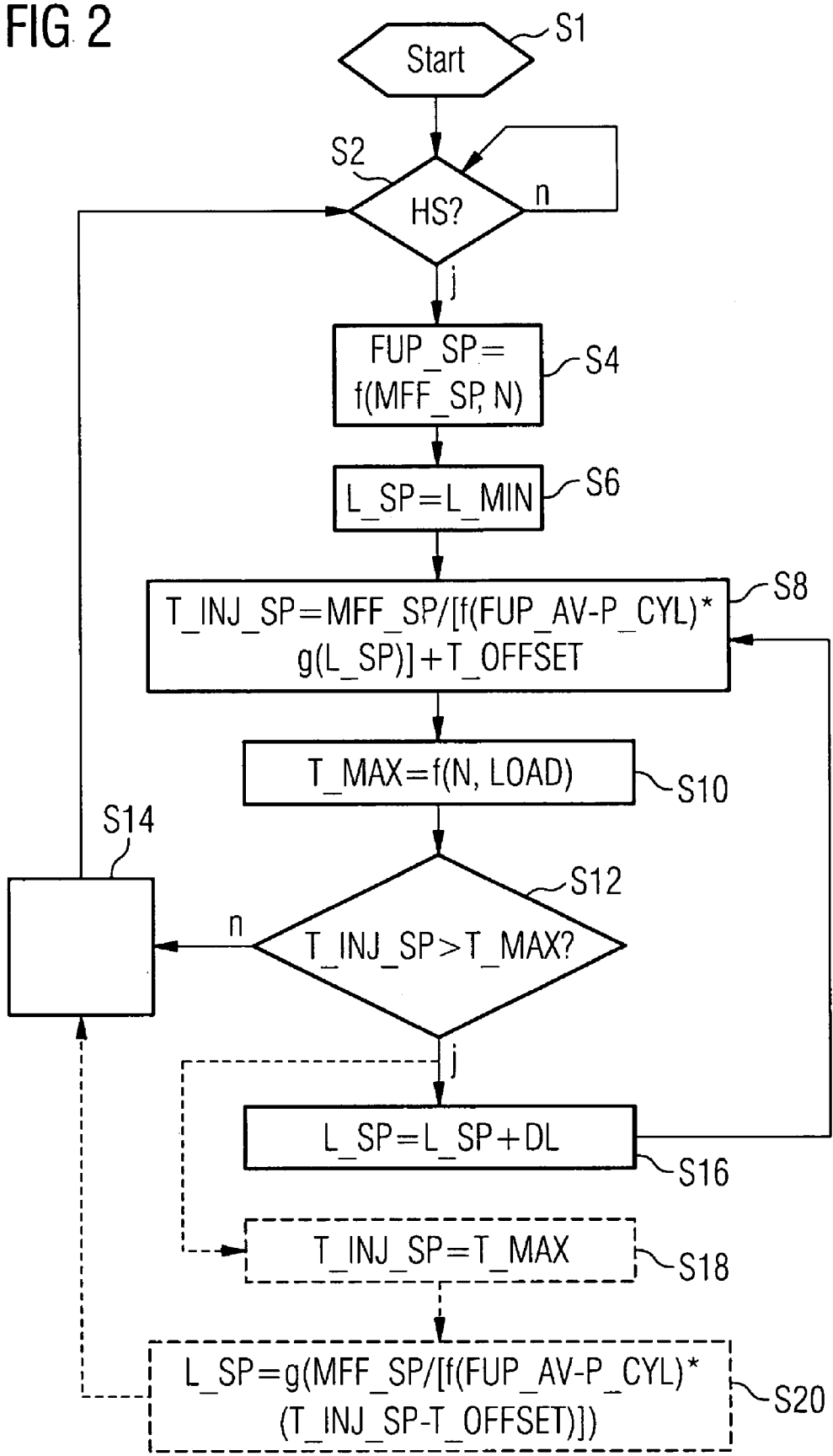
FIG. 2 shows a flowchart for a program for controlling the internal combustion engine.

By means of the program according to FIG. 2 it is possible to easily ensure that the fuel pressure can also be set during homogenous operation HS of the internal combustion engine to a very high value and that a very good atomization of the fuel can thus be ensured. Furthermore, according to the fuel mass to be injected the desired value L_SP for the stroke of the injection needle is set to be as small as possible. This also contributes to good atomization of the fuel.

As an alternative to step S16, a step S18 can be provided which is executed when the condition in step S12 is satisfied. In the step S18, the desired value T_INJ_SP is set to the maximum duration value T_MAX. Then in a step S20 a desired value L_SP for the stroke of the injection needle is determined and this is done by appropriate reversal of the relationship according to step S8. Following this, the processing is then continued in step S14.

The execution of the steps S4 to S20 is particularly appropriate especially in the situation during homogenous operation HS when a small fuel mass is to be metered because here particularly it is thus possible to prevent an excessive reduction in the desired value FUP_SP for the fuel pressure which is disadvantageous for the atomization. Homogenous operation HS takes place in this context particularly in order to regenerate the NOX catalytic converter 23. During execution of the steps S4 to S20 during homogenous operation, the pressure can thus be set where applicable approximately as high as during the stratified charge operation of the internal combustion engine.

The invention claimed is:

1. A method for controlling an internal combustion engine having an injection valve that meters fuel directly into a combustion chamber of a cylinder having a variable stroke injection needle whose stroke is variably determined for a given injection process, and during homogenous operation of the internal combustion engine achieves a desired homogenous distribution of the fuel in the combustion chamber, comprising:
    predefining a desired value of a fuel pressure;
    assigning a predefined minimum stroke value to a desired value for the stroke of the injection needle;
    determining a desired value for an injection duration based at least on the desired value for the stroke of the injection needle;
    comparing the determined desired value for the injection duration to a predefined maximum value for the injection duration;
    if the desired value for the injection duration is less than or equal to the predefined maximum injection duration value, controlling the injection valve in accordance with the determined desired value for the stroke of the injection needle and the determined desired value for the injection duration; and
    if the desired value for the injection duration is greater than the predefined maximum injection duration value, varying the desired value for the stroke of the injection needle until a resulting desired value for the injection duration is less than or equal to the predefined maximum injection duration value, and controlling the injection valve in accordance with the varied value for the stroke of the injection needle and the resulting desired value for the injection duration.

2. The method as claimed in claim 1, wherein the stroke of the injection needle is progressively varied in stages.

3. The method as claimed in claim 2, wherein the maximum injection duration value is determined depending on a variable that represents an opening duration of a gas inlet valve.

4. The method as claimed in claim 3, wherein the variable is a rotational speed and/or load of the internal combustion engine.

5. The method as claimed in claim 4, wherein the desired value for the fuel pressure is determined depending on the desired value for the fuel mass and the rotational speed of the engine.

6. A device for controlling an internal combustion engine with an injection valve that meters fuel directly into a combustion chamber of a cylinder and has an injection needle whose stroke is variably determined for a given injection process, whereby during homogenous operation of the internal combustion engine a desired homogenous distribution of the fuel in the combustion chamber is achieved, comprising:
    a fuel pressure controller that predefines a desired value of a fuel pressure;
    a stroke value controller that assigns a predefined minimum stroke value to a desired value for the stroke of the injection needle; and
    a metered fuel mass controller that:
        determines a desired value for an injection duration based at least on the desired value for the stroke of the injection needle;
        compares the determined desired value for the injection duration to a predefined maximum value for the injection duration;
        if the desired value for the injection duration is less than or equal to the predefined maximum injection duration value, controls the injection valve in accordance with the determined desired value for the stroke of the injection needle and the determined desired value for the injection duration, and if the desired value for the injection duration is greater than the predefined maximum injection duration value, varies the desired value for the stroke of the injection needle until a resulting desired value for the injection duration is less than or equal to the predefined maximum injection duration value, and controls the injection valve in accordance with the varied value for the stroke of the injection needle and the resulting desired value for the injection duration.

7. The device as claimed in claim 6, wherein stroke value controller varies the stroke of the injection needle is progressively in stages.

8. The device as claimed in claim 7, wherein the metered fuel mass controller determines a maximum injection duration value depending on a variable that represents an opening duration of a gas inlet valve.

9. The device as claimed in claim 8, wherein the variable is a rotational speed and/or load of the internal combustion engine.

10. The device as claimed in claim 9, wherein the desired value for the fuel pressure is determined depending on the desired value for the fuel mass and the rotational speed of the engine.

* * * * *